United States Patent
Yamashita et al.

(10) Patent No.: US 10,875,996 B2
(45) Date of Patent: Dec. 29, 2020

(54) METHACRYLIC COPOLYMER AND MOLDED ARTICLE

(71) Applicant: KURARAY CO., LTD., Kurashiki (JP)

(72) Inventors: Taketomo Yamashita, Tainai (JP); Fumihiko Okabe, Tainai (JP); Atsuhiro Nakahara, Chiyoda-ku (JP)

(73) Assignee: KURARAY CO., LTD., Kurashiki (JP)

( * ) Notice: Subject to any disclaimer, the term of this patent is extended or adjusted under 35 U.S.C. 154(b) by 34 days.

(21) Appl. No.: 16/473,909

(22) PCT Filed: Dec. 26, 2017

(86) PCT No.: PCT/JP2017/046636
§ 371 (c)(1),
(2) Date: Jun. 26, 2019

(87) PCT Pub. No.: WO2018/124069
PCT Pub. Date: Jul. 5, 2018

(65) Prior Publication Data
US 2020/0317902 A1    Oct. 8, 2020

(30) Foreign Application Priority Data
Dec. 27, 2016    (JP) .................. 2016-254134

(51) Int. Cl.
*C08F 220/12*    (2006.01)
*C08L 33/12*    (2006.01)
*C08F 220/18*    (2006.01)
*C08J 5/18*    (2006.01)

(52) U.S. Cl.
CPC ........ *C08L 33/12* (2013.01); *C08F 220/1818* (2020.02); *C08J 5/18* (2013.01); *C08L 2201/08* (2013.01); *C08L 2201/10* (2013.01); *C08L 2203/16* (2013.01)

(58) Field of Classification Search
CPC . C08F 220/12; C08F 220/14; C08F 220/1818
See application file for complete search history.

(56) References Cited

U.S. PATENT DOCUMENTS 5,643,645 A * 7/1997 Banyay .................. B29C 43/22
428/34.1

FOREIGN PATENT DOCUMENTS

| JP | 2000-9946 A | 1/2000 | |
|---|---|---|---|
| JP | 2000-266901 A | 9/2000 | |
| JP | 2001-139638 A | 5/2001 | |
| JP | 2001139638 A * | 5/2001 | ............. C08F 20/18 |
| JP | 2001-310910 A | 11/2001 | |
| JP | 2001310910 A * | 11/2001 | ............. C07C 29/86 |
| JP | 2012-31380 A | 2/2012 | |
| JP | 2015-163713 A | 9/2015 | |
| WO | WO 2015/064575 A1 | 5/2015 | |

OTHER PUBLICATIONS

International Search Report dated Feb. 20, 2018 in PCT/JP2017/046636 filed Dec. 26, 2017.

* cited by examiner

*Primary Examiner* — Robert D Harlan
(74) *Attorney, Agent, or Firm* — Oblon, McClelland, Maier & Neustadt, L.L.P.

(57) ABSTRACT

A methacrylic copolymer having high thermal resistance and low water absorption and being hardly decomposed thermally is provided. The methacrylic copolymer comprises 5 to 22% by mass of a structural unit derived from a monomer represented by formula (1) (in formula (1), $R^1$ represents a hydrogen atom or a methyl group, $R^2$ represents a 1C-4C alkyl group, and "n" is an integer of 1 to 3.) and 78 to 95% by mass of a structural unit derived from a methacrylic acid ester monomer other than the monomer represented by the formula (1), and has a saturated water absorption of not more than 1.6% by mass.

12 Claims, No Drawings

METHACRYLIC COPOLYMER AND MOLDED ARTICLE

TECHNICAL FIELD

The present invention relates to a methacrylic copolymer and a shaped product comprising the copolymer.

BACKGROUND ART

A methacrylate resin is excellent in transparency, light resistance, surface hardness, and the like. A methacrylate resin composition comprising the methacrylate resin can be shaped into the form of various optical members such as light guide plates and lens.

In recent years, a demand for a light weight and large area liquid crystal display is increasing, and accordingly the thin-walled and large area of optical members are required. Furthermore, with the enhanced image quality of displays, a high level of precision is required for optical properties such as refractive index and retardation. Thin-walled and wide-area shaped products have optical properties significantly susceptible to dimensional changes due to moisture absorption and heat, and the like. Therefore, a methacrylate resin composition that is a raw material for an optical member is strongly required to have high transparency, low hygroscopicity, high thermal resistance, a small dimensional change, high impact strength, and high formability, for example.

As being developed to have high thermal resistance and low hygroscopicity, Patent Document 1 discloses a (co) polymer obtained by polymerization or copolymerization of 2-methacryloyloxymethyl-2-methylbicyclo[2.2.1]heptane. Moreover, Patent Documents 2 and 3 disclose (co)polymers obtained by polymerization or copolymerization of 3-methacryloyloxymethyl-3-methyltetracyclo[4.4.0.1$^{2,5}$.1$^{7,10}$]dodecane.

CITATION LIST

Patent Literatures

Patent Document 1: JP 2001-310910 A (JP 3720713 B)
Patent Document 2: JP 2000-009946 A (JP 3945910 B)
Patent Document 3: JP 2001-139638 A

SUMMARY OF THE INVENTION

Problems to be Solved by the Invention

However, the thermal resistance of the copolymer of the monomers disclosed in Patent Document 1 with methyl methacrylate is not sufficient. Furthermore, Patent Documents 2 and 3 disclose only evaluation of the synthesis of core materials or monomers for optical fibers. Specifically, the proportion of the monomers in the copolymer disclosed therein should be increased in order to satisfy the physical properties required for an optical fiber core material, and the resulting material tends to be fragile. Moreover, examination made in these documents concerning water absorption is insufficient.

Therefore, an object of the present invention is to provide a copolymer exhibiting excellent thermal resistance and low water absorption and being hardly decomposed thermally through the use of an appropriate amount of polymerizable monomers for imparting high thermal resistance and low water absorption while suppressing the problem of fragility.

Means for Solving the Problems

According to the present invention, the above object can be achieved by the following aspect.

[1] A methacrylic copolymer, comprising 5 to 22% by mass of a structural unit derived from a monomer represented by the following formula (1) and 78 to 95% by mass of a structural unit derived from methacrylic acid ester monomer other than the monomer represented by the formula (1), and having a saturated water absorption of not more than 1.6% by mass,

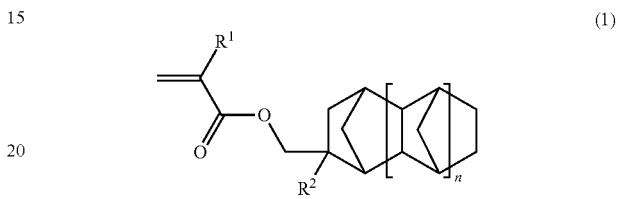

(1)

wherein, in the formula (1), $R^1$ represents a hydrogen atom or a methyl group, $R^2$ represents an alkyl group having 1 to 4 carbon atoms, and "n" represents an integer of 1 to 3.

[2] The methacrylic copolymer according to [1], wherein the methacrylic acid ester monomer other than the monomer represented by the formula (1) is methyl methacrylate.

[3] The methacrylic copolymer according to [1] or [2], wherein the monomer represented by the formula (1) is 3-(meth)acryloyloxymethyl-3-methyltetracyclo [4.4.0.1$^{2,5}$.1$^{7,10}$] dodecane.

[4] A shaped product, comprising the methacrylic copolymer according to any one of [1] to [3].

[5] The shaped product according to [4], which is a sheet or a film.

Advantageous Effects of the Invention

The methacrylic copolymer of the present invention has high thermal resistance and low water absorption and is hardly decomposed thermally.

EMBODIMENTS FOR CARRYING OUT THE INVENTION

The methacrylic copolymer of the present invention (hereinafter may also be referred to as simply "copolymer") comprises a structural unit derived from the monomer represented by the formula (1). The monomer represented by the formula (1) has a specific structure and a predetermined number of ring structures, so that it can impart not only high thermal resistance but also low water absorption to the thus obtained copolymer. Further, a carbon atom consisting the ring structures, to which a (meth)acryloyloxymethyl group binds, is a quaternary carbon atom because of the substituent $R^2$. Furthermore, the ring structure binds to (meth)acryloyloxy group via methylene group, so that the ring structure is not easily released by heating and the resultant is excellent in resistance to thermal decomposition. If that carbon atom is a tertiary carbon atom, the thus obtained copolymer has decreased resistance to thermal decomposition. This limits the forming temperature.

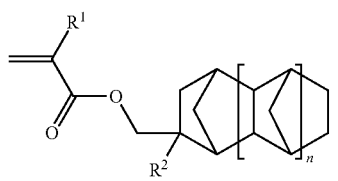

(1)

In the formula (1), $R^1$ represents a hydrogen atom or a methyl group, $R^2$ represents an alkyl group having 1 to 4 carbon atoms, and "n" represents an integer of 1 to 3.

The copolymer of the present invention comprises 5 to 22% by mass, preferably 8 to 20% by mass, and more preferably 10 to 20% by mass of a structural unit derived from the monomer represented by the formula (1) relative to the mass of the copolymer. The content of the structural unit derived from the monomer represented by the formula (1) is within the range, so that the copolymer of the present invention is excellent in thermal resistance and low in water absorption and has decreased fragility.

Specific examples of the monomer represented by the formula (1) can include: monomers represented by the formula (1) wherein n=1, such as 3-(meth)acryloyloxymethyl-3-methyltetracyclo [4.4.0.1$^{2,5}$.1$^{7,10}$] dodecane, 3-(meth)acryloyloxymethyl-3-ethyltetracyclo [4.4.0.1$^{2,5}$.1$^{7,10}$] dodecane, 3-(meth)acryloyloxymethyl-3-propyltetracyclo [4.4.0.1$^{2,5}$.1$^{7,10}$] dodecane, and 3-(meth)acryloyloxymethyl-3-butyltetracyclo [4.4.0.1$^{2,5}$.1$^{7,10}$] dodecane; monomers represented by the formula (1) wherein n=2, such as 4-(meth)acryloyloxymethyl-4-methylhexacyclo [6.6.1.1$^{3,6}$.1$^{10,13}$.0$^{2,7}$.0$^{9,14}$] heptadecane, 4-(meth)acryloyloxymethyl-4-ethylhexacyclo [6.6.1.1$^{3,6}$.1$^{10,13}$.0$^{2,7}$.0$^{9,14}$] heptadecane, 4-(meth)acryloyloxymethyl-4-propylhexacyclo [6.6.1.1$^{3,6}$.1$^{10,13}$.0$^{2,7}$.0$^{9,14}$] heptadecane, and 4-(meth)acryloyloxymethyl-4-butylhexacyclo [6.6.1.1$^{3,6}$.1$^{10,13}$.0$^{2,7}$.0$^{9,14}$] heptadecane; and monomers represented by the formula (1) wherein n=3, such as 5-(meth)acryloyloxymethyl-5-methyloctacyclo [8.8.0.1$^{2,9}$.1$^{4,7}$.1$^{11,18}$.1$^{13,16}$.0$^{3,8}$.0$^{12,17}$] docosane, 5-(meth)acryloyloxymethyl-5-ethyloctacyclo [8.8.0.1$^{2,9}$.1$^{4,7}$.1$^{11,18}$.1$^{13,16}$.0$^{3,8}$.0$^{12,17}$] docosane, 5-(meth)acryloyloxymethyl-5-propyloctacyclo [8.8.0.1$^{2,9}$.1$^{4,7}$.1$^{11,18}$.1$^{13,16}$.0$^{3,8}$.0$^{12,17}$] docosane, and 5-(meth)acryloyloxymethyl-5-butyloctacyclo [8.8.0.1$^{2,9}$.1$^{4,7}$.1$^{11,18}$.1$^{13,16}$.0$^{3,8}$.0$^{12,17}$] docosane. In these monomers, a hydrogen atom directly binding to a carbon atom constituting a ring structure may be substituted with an alkyl group having 1 to 4 carbon atoms.

Preferable examples of the monomer represented by the formula (1) can include monomers represented by the formula (1) wherein $R^1$ is a methyl group, monomers represented by the formula (1) wherein $R^2$ is a methyl group, or monomers represented by the formula (1) wherein n=1. Among the monomers represented by the formula (1), 3-(meth)acryloyloxymethyl-3-methyltetracyclo [4.4.0.1$^{2,5}$.1$^{7,10}$] dodecane is more preferred, and 3-methacryloyloxymethyl-3-methyltetracyclo [4.4.0.1$^{2,5}$.1$^{7,10}$] dodecane is most preferred.

The copolymer of the present invention comprises 78 to 95% by mass of a structural unit derived from a methacrylic acid ester monomer (hereinafter may also be referred to as "monomer (2)") other than the above monomers represented by the formula (1) relative to the mass of the copolymer. The content of the structural unit derived from monomer (2) ranges from more preferably 80 to 92% by mass, and particularly preferably 80 to 90% by mass. Examples of such methacrylic acid ester monomer; that is, monomer (2), can include: methacrylic acid alkyl esters such as methyl methacrylate, ethyl methacrylate, and butyl methacrylate; methacrylic acid aryl esters such as phenyl methacrylate; and methacrylic acid cycloalkyl esters such as cyclohexyl methacrylate, 2-isobornyl methacrylate, 8-tricyclo [5.2.1.0$^{2,6}$] decanyl methacrylate, 2-norbornyl methacrylate, and 2-adamantyl methacrylate. Of these, methacrylic acid alkyl esters are preferred, and in view of transparency of the thus obtained copolymer, methyl methacrylate is most preferred.

The copolymer of the present invention may comprise a structural unit derived from a radical polymerizable monomer (hereinafter may also be referred to as "radical polymerizable monomer (3)") other than the monomer represented by the formula (1) and monomer (2). Examples of such radical polymerizable monomer (3) can include acrylic acid alkyl esters such as methyl acrylate, ethyl acrylate, n-propyl acrylate, isopropyl acrylate, n-butyl acrylate, isobutyl acrylate, s-butyl acrylate, t-butyl acrylate, amyl acrylate, isoamyl acrylate, n-hexyl acrylate, 2-ethylhexyl acrylate, pentadecyl acrylate, and dodecyl acrylate; acrylic acid derivatives such as 2-hydroxyethyl acrylate, 2-ethoxyethyl acrylate, glycidyl acrylate, allyl acrylate, and benzyl acrylate; vinyl aromatic hydrocarbons such as styrene, α-methyl styrene, p-methyl styrene, and m-methyl styrene; vinyl alicyclic hydrocarbons such as vinylcyclohexane, vinylcyclopentane, vinylcyclohexene, vinylcycloheptane, vinylcyclohepcene, and vinylnorbornene; ethylenic unsaturated carboxylic acids such as maleic anhydride, maleic acid, and itaconic acid; olefins such as ethylene, propylene, 1-butene, isobutylene, and 1-octene; conjugated dienes such as butadiene, isoprene, and myrcene; acrylamide, methacrylamide, acrylonitrile, methacrylonitrile, vinyl acetate, vinyl ketone, vinyl chloride, vinylidene chloride, and vinylidene fluoride; ethylenic unsaturated heterocyclic compounds such as 2-vinylfuran, 2-isopropenylfuran, 2-vinylbenzofuran, 2-isopropenylbenzofuran, 2-vinyldibenzofuran, 2-vinyl thiophene, 2-isopropenylthiophene, 2-vinyldibenzothiophene, 2-vinylpyrrole, N-vinylindole, N-vinylcarbazole, 2-vinyloxazole, 2-isopropenyloxazole, 2-vinylbenzoxazole, 3-vinylisooxazole, 3-isopropenylisooxazole, 2-vinylthiazole, 2-vinylimidazole, 4(5)-vinylimidazole, N-vinylimidazole, N-vinylimidazoline, 2-vinylbenzimidazole, 5(6)-vinylbenzimidazole, 5-isopropenylpyrazol, 2-isopropenyl 1,3,4-oxadiazole, vinyltetrazol, 2-vinylpyridine, 4-vinylpyridine, 2-isopropenylpyridine, 3-vinylpyridine, 3-isopropenylpyridine, 2-vinylquinoline, 2-isopropenylquinoline, 4-vinylquinoline, 4-vinylpyrimidine, 2,4-dimethyl-6-vinyl-S-triazine, 3-methylidene dihydrofuran-2(3H)-one, 4-methyl-3-methylidene dihydrofuran-2(3H)-one, and 4-decyl-3-methylidene dihydrofuran-2(3H)-one; phosphoric acid esters having ethylenic unsaturated group such as dimethylmethacryloyloxymethyl phosphate, and 2-methacryloyloxy-1-methylethyl phosphate.

An amount of the structural unit derived from radical polymerizable monomer (3) comprised in the copolymer of the present invention is preferably not more than 15% by mass, more preferably not more than 10% by mass, further preferably not more than 5% by mass relative to the mass of the copolymer in view of a balance of thermal resistance, low water absorption, melt formability, and the like. The amount of the structural unit derived from radical polymerizable monomer (3) comprised in the copolymer of the present invention may be not less than 0.5% by mass.

The copolymer of the present invention has a weight average molecular weight of preferably 40 thousand to 300 thousand, more preferably 60 thousand to 250 thousand, and particularly preferably 80 thousand to 200 thousand. With the weight average molecular weight within such ranges, the copolymer is excellent in strength and formability.

The copolymer of the present invention has a ratio of the weight average molecular weight to a number average molecular weight (hereinafter the ratio is referred to as "molecular weight distribution".) of preferably 1.01 to 3.0, more preferably 1.05 to 2.7, and further preferably 1.10 to 2.5. With the molecular weight distribution within such ranges, the obtained copolymer can have good formability. The weight average molecular weight and molecular weight distribution are values in terms of standard polystyrene, as measured by GPC (gel permeation chromatography).

The weight average molecular weight and molecular weight distribution can be controlled through adjustment of the type, amount and the like of a polymerization initiator and a chain transfer agent upon polymerization reaction.

The copolymer of the present invention has a glass transition temperature of preferably 120 to 350° C., and more preferably 130 to 250° C. With an excessively low glass transition temperature, the copolymer has poor thermal resistance and thus possible applications thereof are limited. With an excessively high glass transition temperature, the copolymer is likely to be fragile and easily broken. Note that glass transition temperature is measured in accordance with JIS K7121. Specifically, a DSC curve is measured by differential scanning calorimetry under conditions where the temperature of the copolymer of the present invention is increased once to 270° C., subsequently decreased to room temperature, and then the temperature is increased from room temperature to 270° C. at 10° C./minute, and then a midpoint glass transition temperature found from the DSC curve measured at the 2nd temperature increase is designated as the glass transition temperature of the present invention.

The copolymer of the present invention has a saturated water absorption of not more than 1.6% by mass, and preferably not more than 1.5% by mass. With the saturated water absorption within the above range, the copolymer is excellent in dimensional stability. The saturated water absorption may be not less than 0.8% by mass, or not less than 1.0% by mass. Note that saturated water absorption can be measured by a method described in Examples.

The copolymer of the present invention has a thermal decomposition temperature of preferably not lower than 290° C., more preferably not lower than 295° C., and further preferably not lower than 300° C. The thermal decomposition temperature may be not higher than 320° C. Note that the thermal decomposition temperature can be measured by a method described in Examples.

The copolymer of the present invention has a flexural modulus of preferably not less than 3000 MPa, and more preferably not less than 3100 MPa. The flexural modulus may be not more than 3300 MPa. With a low flexural modulus, the copolymer is likely to be fragile and easily broken. In particular, when shaped products obtained from the copolymer are films or sheets, these shaped products with a flexural modulus within the above range are preferred since they are not easily broken. Note that the flexural modulus can be measured by a method described in Examples.

There is no particular limitation for a method for manufacturing the copolymer of the present invention. Generally, in view of productivity, the copolymer is preferably manufactured by the radical polymerization method comprising adjusting a polymerization temperature, a polymerization duration, the type and amount of a chain transfer agent, the type and amount of a polymerization initiator and the like.

Furthermore, the monomer represented by the formula (1) can also be subjected to anionic polymerization, and thus anionic polymerization can also be employed in order to obtain a block copolymer or a copolymer with high stereoregularity.

The radical polymerization for manufacturing the copolymer of the present invention is preferably performed in the absence or presence of a solvent, and is preferably performed in the absence of a solvent from a viewpoint of obtaining the copolymer having a low impurity concentration. From a viewpoint of preventing the shaped product from silver streak and/or coloring, the polymerization reaction is preferably performed with a low level of the dissolved oxygen in raw material for the polymerization reaction. Further, the polymerization reaction is preferably performed under an atmosphere of an inert gas such as nitrogen gas.

There is no particular limitation for a polymerization initiator to be used in the radical polymerization method for manufacturing the copolymer of the present invention as long as it generates a reactive radical. Examples thereof can include t-hexylperoxyisopropyl monocarbonate, t-hexylperoxy 2-ethylhexanoate, 1,1,3,3-tetramethylbutylperoxy 2-ethylhexanoate, t-butylperoxypivalate, t-hexylperoxypivalate, t-butylperoxyneodecanoate, t-hexylperoxyneodecanoate, 1,1,3,3-tetramethylbutylperoxyneodecanoate, 1,1-bis(t-hexylperoxy)cyclohexane, benzoyl peroxide, 3,5,5-trimethylhexanoyl peroxide, lauroyl peroxide, 2,2'-azobis (isobutyronitrile), 2,2'-azobis(2-methylbutyronitrile), and dimethyl 2,2'-azobis(2-methylpropionate). Among these, t-hexylperoxy 2-ethylhexanoate, 1,1-bis(t-hexylperoxy)cyclohexane, and dimethyl 2,2'-azobis(2-methylpropionate) are preferred.

A 1-hour half-life temperature of the polymerization initiator is preferably 60 to 140° C., more preferably 80 to 120° C. Further, the polymerization initiator to be used for manufacturing the copolymer has a hydrogen abstraction ability of preferably not more than 20%, more preferably not more than 10%, and even more preferably not more than 5%. These polymerization initiators can be used alone or in combination of two or more. An amount of the polymerization initiator to be used is preferably 0.0001 to 0.02 part by mass, more preferably 0.001 to 0.01 part by mass, and even more preferably 0.005 to 0.007 part by mass relative to 100 parts by mass of the monomer subjected to the polymerization reaction.

Note that the hydrogen abstraction abilities can be available in technical documents from manufacturers of polymerization initiators (for example, a technical document from NOF Corporation, "The hydrogen abstraction abilities of organoperoxides and initiator efficiency" (created on April, 2003) and the like. Further, they can be measured by the radical trapping method in which α-methylstyrene dimers are used, i.e., the α-methylstyrene dimer trapping method. The above determination is usually performed as follows. First, a polymerization initiator is cleaved in the coexistence of α-methylstyrene dimers as a radical trapping agent to generate radical fragments. Among the radical fragments generated, a radical fragment with a low hydrogen abstraction ability binds to and is captured by a double bond of an α-methylstyrene dimer. In contrast, a radical fragment with a high hydrogen abstraction ability abstracts a hydrogen from cyclohexane to generate a cyclohexyl radical, which binds to and is captured by a double bond of an α-methylstyrene dimer, so as to generate captured products of cyclohexane. As used herein, the hydrogen abstraction ability is a ratio (molar ratio) of radical fragments with a high hydrogen abstraction ability to a theoretical yield of radical fragments as determined by quantifying cyclohexane or captured products of cyclohexane.

Examples of a chain transfer agent to be used in the radical polymerization method for manufacturing the copolymer of the present invention can include alkyl mercaptans such as n-octylmercaptan, n-dodecylmercaptan, t-dodecylmercaptan, 1,4-butanedithiol, 1,6-hexanedithiol, ethyleneglycol bisthiopropionate, butanediol bisthioglycolate, butanediol bisthiopropionate, hexandiol bisthioglycolate, hexandiol bisthiopropionate, trimethylolpropane tris-(β-thiopropionate), and pentaerythritol tetrakisthiopropionate. Among these, monofunctional alkyl mercaptans such as n-octylmercaptan, and n-dodecylmercaptan are preferred. These chain transfer agents can be used alone or in combination of two or more.

An amount of the chain transfer agent to be used is preferably 0.1 to 1 part by mass, more preferably 0.15 to 0.8 part by mass, even more preferably 0.2 to 0.6 part by mass, and most preferably 0.2 to 0.5 part by mass relative to 100 parts by mass of the monomer subjected to the polymerization reaction. Further, the amount of the chain transfer agent to be used is preferably 2500 to 10000 parts by mass, more preferably 3000 to 9000 parts by mass, and even more preferably 3500 to 6000 parts by mass relative to 100 parts by mass of the polymerization initiator. The amount of the chain transfer agent to be used within the above ranges makes it possible to control the molecular weight of the resulting copolymer, so as to be able to impart good shape forming processability and high mechanical strength to the resulting copolymer.

When a radical polymerization method is selected for manufacturing the copolymer of the present invention and a solvent is used for the method, there is no limitation for the solvent to be used herein as long as monomers and copolymers can be dissolved therein, but it is preferably an aromatic hydrocarbon such as benzene, toluene, and ethylbenzene. These solvents can be used alone or in combination of two or more. An amount of the solvent to be used can be appropriately adjusted in view of the viscosity of a reaction liquid and productivity. For example, the amount of the solvent to be used is preferably not more than 100 parts by mass, and more preferably not more than 90 parts by mass relative to 100 parts by mass of raw materials for the polymerization reaction.

When a radical polymerization method is selected for manufacturing the copolymer of the present invention, the temperature during the polymerization reaction is preferably 100 to 200° C., more preferably 110 to 180° C. In the polymerization temperature of not lower than 100° C., the productivity tends to be improved because of an improved polymerization rate, a reduced viscosity of a polymerization liquid and the like. In the polymerization temperature of not higher than 200° C., a polymerization rate can easily be controlled, and the formation of by-products can be controlled to suppress the coloring of the copolymer of the present invention. The duration of a polymerization reaction is preferably 0.5 to 4 hours, more preferably 1.5 to 3.5 hours, and even more preferably 1.5 to 3 hours. Note that in the case of a continuous flow reactor, the duration of a polymerization reaction corresponds to the mean residence time in the reactor. In a case where the temperature during a polymerization reaction and the duration of the polymerization reaction fall in these ranges, the copolymer having excellent transparency can be produced with high efficiency.

The radical polymerization may be performed using batch reactor system. The radical polymerization is preferably performed using continuous flow reactor system in view of productivity. In a continuous flow reaction, a polymerization reaction raw material (a mixture comprising monomer (comprising the monomer represented by formula (1), monomer (2), or radical polymerizable monomer (3)), polymerization initiator, chain transfer agent and the like) is prepared, for example, under a nitrogen atmosphere. This is then fed to a reactor at a constant flow rate while the liquid in the reactor is withdrawn at a flow rate corresponding to the feeding rate. As the reactor, a tube reactor which can create near plug flow conditions and/or a tank reactor which can create near complete mixing conditions can be used. Further, polymerization may be performed in one reactor according to the continuous flow method, or may be performed in two or more reactors connected together according to the continuous flow method.

In the present invention, at least one continuous flow tank reactor is preferably used. The liquid volume in a tank reactor upon polymerization reaction is preferably ¼ to ¾, more preferably ⅓ to ⅔ relative to the capacity of the tank reactor. The reactor is usually equipped with a stirrer. As a stirrer, mentioned can be a static stirrer and a dynamic stirrer. Examples of a dynamic stirrer can include a Max blend stirrer, a stirrer having lattice-shaped impellers which rotate around a vertical rotation axis arranged at the center, a propeller stirrer, and a screw stirrer. Among these, a Max blend stirrer is preferably used in terms of homogeneous mixing performance.

Polymerization conversion when a radical polymerization is selected for manufacturing the copolymer of the present invention is preferably 50 to 100% by mass and more preferably 70 to 99% by mass in a case of suspension polymerization with a batch reactor system.

Moreover, when a continuous flow tank reactor system is used, the polymerization conversion is preferably 20 to 80% by mass, more preferably 30 to 70% by mass, and further preferably 35 to 65% by mass. The polymerization conversion of not less than 20% by mass tends to facilitate the removal of remaining unreacted monomers and improve the appearance of a shaped product comprising the copolymer. The polymerization conversion of not more than 70% by mass tends to result in reduced viscosity of a polymerization liquid and improved productivity.

After the completion of polymerization, volatile matters such as unreacted monomers are removed, if needed. There is no particular limitation for a method of removal, but heating devolatilization is preferred. As a devolatilization method, mentioned can be an equilibrium flash method and an adiabatic flash method. The devolatilization temperature in the adiabatic flash method is preferably 200 to 280° C., more preferably 220 to 260° C. The duration of heating a resin in the adiabatic flash method is preferably 0.3 to 5 minutes, more preferably 0.4 to 3 minutes, and even more preferably 0.5 to 2 minutes. When devolatilization is performed within these temperature ranges for these heating durations, the copolymer with less coloring can easily be obtained. Removed unreacted monomers can be recovered to recycle in a polymerization reaction. The yellow index of the recovered monomers may be increased due to heat applied during recovery operations and the like. Accordingly, the recovered monomers are preferably refined by an appropriate method to reduce the yellow index.

The shaped product of the present invention comprises the copolymer of the present invention. When the shaped product of the present invention is manufactured, the copolymer of the present invention may be mixed with other polymers and subjected to shape forming as long as the effects of the present invention are not adversely affected. Examples of such other polymers can include polyolefin resins such as polyethylene, polypropylene, polybutene-1, poly-4-methylpentene-1, and polynorbornene; ethylene ionomer; styrene resins such as polystyrene, styrene-maleic anhydride copolymer, high impact polystyrene, AS resin, ABS resin, AES resin, AAS resin, ACS resin, and MBS resin; methyl methacrylate polymers and methyl methacrylate-styrene copolymers; polyester resins such as polyethylene terephthalate and polybutylene terephthalate; polyamides such as Nylon 6, Nylon 66 and polyamide elastomers; polycarbonate, polyvinyl chloride, polyvinylidene chloride, polyvinyl alcohol, ethylene-vinyl alcohol copolymers, polyacetal, polyvinylidene fluoride, polyurethane, modified polyphenylene ether, polyphenylene sulfide, silicone modified resins; acrylic rubber, acrylic thermoplastic elastomers, and silicone rubber; styrene thermoplastic elastomers such as SEPS, SEBS and SIS; and olefin rubber such as IR, EPR, and EPDM.

The shaped product of the present invention comprises preferably not less than 80% by mass, and more preferably not less than 90% by mass of the copolymer of the present invention. There is no particular limitation for the method for manufacturing the shaped product of the present invention. The copolymer of the present invention or a forming material containing the copolymer of the present invention are subjected to the following manufacturing methods. Examples of the manufacturing method can include melt-forming methods such as T-die methods (e.g., lamination method and co-extruding method), inflation methods (e.g., co-extrusion method), compression molding method, blow molding method, calendar molding method, vacuum molding method, injection molding methods (e.g., insert molding method, two-color method, press method, core back method, and sandwich method), and solution casting methods. Among these, T-die method, inflation method or injection molding method is preferred in view of high productivity and cost.

The copolymer of the present invention can be formed into a pellet and the like in order to improve convenience at the time of storage, transportation or shape forming. To obtain the shaped product of the present invention, shape forming may be performed multiple times. For example, the copolymer of the present invention is formed into a pelleted product; that is, a shaped product in the form of pellets, and then the pelleted product can then be further formed into a shaped product in a desired shape.

To the copolymer of the present invention, various additives such as an antioxidizing agent, a heat deterioration inhibitor, an ultraviolet absorber, a light stabilizer, a lubricant, a parting agent, a polymer processing aid, an antistatic agent, a flame retardant, dyes and pigments, a light diffusing agent, an organic dye, a delustering agent, and fluorescent substance may be added as necessary. The total amount of such various additives contained in the copolymer is preferably not more than 7% by mass, more preferably not more than 5% by mass, and further preferably not more than 4% by mass relative to the copolymer of the present invention.

The various additives may be added to a polymerization reaction solution when the copolymer is manufactured, may be added to the copolymer manufactured by polymerization reaction, or may be added when a shaped product is manufactured.

An antioxidizing agent alone has an effect for preventing oxidation deterioration of a resin in the presence of oxygen. Examples thereof can include a phosphorus antioxidizing agent, a hindered phenol antioxidizing agent, and a thioether antioxidizing agent. These antioxidizing agents may be used alone or in combination of two or more. Among these, a phosphorus antioxidizing agent and a hindered phenol antioxidizing agent are preferred in view of the effect for preventing deterioration of an optical property due to coloring. More preferably, a phosphorus antioxidizing agent and a hindered phenol antioxidizing agent are used in combination.

When a phosphorus antioxidizing agent and a hindered phenol antioxidizing agent are used in combination, the mass ratio of the amount of phosphorus antioxidizing agent to be used:the amount of hindered phenol antioxidizing agent to be used ranges from preferably 1:5 to 2:1, and more preferably 1:2 to 1:1.

Preferred examples of the phosphorus antioxidizing agent can include 2,2-methylenebis(4,6-di-t-butylphenyl)octylphosphite (ADEKA Corp.; product name: ADK STAB HP-10), tris(2,4-di-t-butylphenyl)phosphite (BASF A.G.; product name: IRGAFOS168), and 3,9-bis(2,6-di-tert-butyl-4-methylphenoxy)-2,4,8,10-tetraoxa-3,9-diphosphaspiro[5.5]undecane (ADEKA Corp: product name: ADK STAB PEP-36).

Preferred Examples of the hindered phenol antioxidizing agent can include pentaerythrityl-tetrakis[3-(3,5-di-t-butyl-4-hydroxy phenyl)propionate] (BASF A.G.; product name: IRGANOX1010), and octadecyl-3-(3,5-di-t-butyl-4-hydroxyphenyl)propionate (BASF A.G.; product name: IRGANOX1076).

A thermal deterioration inhibitor can prevent thermal deterioration of a resin by scavenging a polymer radical generated when the resin is exposed to high temperature essentially in the absence of oxygen.

Preferred examples of the thermal deterioration inhibitor can include 2-t-butyl-6-(3'-t-butyl-5'-methyl-hydroxybenzyl)-4-m ethylphenylacrylate (Sumitomo Chemical Co., Ltd.; product name: Sumilizer GM), and 2,4-di-t-amyl-6-(3',5'-di-t-amyl-2'-hydroxy-α-methyl benzyl)phenylacrylate (Sumitomo Chemical Co., Ltd.; product name: Sumilizer GS).

An ultraviolet absorber is a compound capable of absorbing ultraviolet light and is said to have a function for mainly converting light energy into thermal energy.

Examples of the ultraviolet absorber can include benzophenones, benzotriazols, triazines, benzoates, salicylates, cyanoacrylates, oxalic anilides, malonic esters, and formamidines. These may be used alone or in combination of two or more.

Benzotriazols, which exhibit a strong effect for preventing optical property deterioration such as coloring due to exposure to ultraviolet light, are preferred as an ultraviolet absorber when the shaped product of the present invention (e.g., films) is used for optical applications. Examples of the benzotriazols can include 2-(2H-benzotriazol-2-yl)-4-(1,1,3,3-tetramethylbutyl)phenol (BASF A.G.; product name: TINUVIN329), 2-(2H-benzotriazol-2-yl)-4,6-bis(1-methyl-1-phenylethyl)phenol (BASF A.G.; product name TINUVIN234), 2,2'-methylenebis[6-(2H-benzotriazol-2-yl)-4-tert-octylphenol] (ADEKA Corp.; LA-31) and 2-(5-octylthio-2H-benzotriazol-2-yl)-6-tert-butyl-4-methylphenol.

Examples of the triazine ultraviolet absorbers can include 2,4,6-tris(2-hydroxy-4-hexyloxy-3-methylphenyl)-1,3,5-triazine (ADEKA Corp.; LA-F70) and analogs thereof such as hydroxyphenyl triazine ultraviolet absorbers (BASF A.G.; TINUVIN477 and TINUVIN460) and 2,4-diphenyl-6-(2-hydroxy-4-hexyloxyphenyl)-1,3,5-triazine.

In order to particularly effectively absorb light with wavelengths of 380 to 400 nm, a metal complex having a ligand with a heterocyclic structure as disclosed in WO 2011/089794 A, WO 2012/124395 A, JP 2012-012476 A, JP 2013-023461 A, JP 2013-112790 A, JP 2013-194037 A, JP 2014-62228 A, JP 2014-88542 A, JP 2014-88543 A, and the like is preferably used as ultraviolet absorber.

A light stabilizer is a compound which is said to have a function for scavenging a radical mainly generated by light oxidation. Examples of suitable light stabilizer can include hindered amines such as a compound having a 2,2,6,6-tetraalkylpiperidine backbone.

Examples of a lubricant can include stearic acid, behenic acid, stearoamide acid, methylenebisstearoamide, hydroxystearic acid triglyceride, paraffin wax, ketone wax, octyl alcohol, and hardened oil.

Examples of a parting agent can include higher alcohols such as cetyl alcohol and stearyl alcohol; glycerin higher fatty acid esters such as stearic acid monoglyceride, and stearic acid diglyceride. In the present invention, higher alcohols and glycerin fatty acid monoesters are preferably used in combination as a parting agent. In a case where higher alcohols and glycerin fatty acid monoesters are used in combination, there is no particular limitation for their ratio, but the mass ratio of the amount of higher alcohols to be used:the amount of glycerin fatty acid monoesters to be used ranges from preferably 2.5:1 to 3.5:1, and more preferably 2.8:1 to 3.2:1.

As a polymer processing aid, used are polymer particles having a particle diameter of 0.05 to 0.5 µm which can be manufactured usually by the emulsion polymerization method. The polymer particles may be monolayer particles comprising a polymer with a single composition ratio and single limiting viscosity or may be multilayer particles comprising two or more types of polymers differing in composition ratio or limiting viscosity. Among these, preferable examples thereof can include two-layered particles having a polymer layer with a low limiting viscosity as the inner layer, and having a polymer layer with a high limiting viscosity of not less than 5 dl/g as the outer layer. A polymer processing aid preferably has a limiting viscosity of 3 to 6 dl/g. If the limiting viscosity is extremely small, the effect for improving formability tends to be low. If the limiting viscosity is extremely large, the forming processability of the copolymer tends to be reduced.

As an organic dye, preferably used is a compound having a function for converting ultraviolet light into visible light.

Examples of a light diffusing agent and a delustering agent can include glass fine particles, polysiloxane cross-linked fine particles, cross-linked polymer fine particles, talc, calcium carbonate, and barium sulfate.

Examples of a fluorescent substance can include a fluorescent pigment, a fluorescent dye, a fluorescent white dye, a fluorescent whitening agent, and a fluorescent bleaching agent.

The shaped product of the present invention is not particularly limited, and a preferred embodiment is a sheet or a film. The thickness of the sheet is preferably more than 0.3 mm and not more than 10 mm, and preferably not less than 0.5 mm and not more than 5 mm, for example. Moreover, the thickness of the film is not more than 0.3 mm, for example. A sheet or film as an embodiment of the shaped product of the present invention can be manufactured by solution cast method, melt casting method, extrusion method, inflation molding method, blow molding method and the like. Among these, extrusion method is preferred from a viewpoint that the sheet or film having excellent transparency, improved toughness, excellent handling property and an excellent balance of toughness, surface hardness and stiffness can be obtained. The temperature of the copolymer to be discharged from an extruder is set at preferably 160 to 270° C., more preferably 220 to 260° C. The copolymer of the present invention is excellent in resistance to thermal decomposition and thus the shape forming thereof can be conducted at high temperatures.

Among the extrusion methods, from a viewpoint that a sheet or film with good surface smoothness, good specular gloss and a low haze can be obtained, preferred is a method comprising extruding the copolymer of the present invention or a forming material comprising the copolymer of the present invention through a T-die in a molten state, and then sandwiching it between two or more mirrored rolls or mirrored belts for forming. Mirrored rolls or mirrored belts are preferably made of a metal. The linear pressure between a pair of mirrored rolls or mirrored belts is preferably not less than 10 N/mm, and more preferably not less than 30 N/mm.

Further, the surface temperatures of mirrored rolls or mirrored belts are both preferably not higher than 130° C. Moreover, in a pair of mirrored rolls or mirrored belts, the surface temperature of at least one of them is preferably not lower than 60° C. With the surface temperature set at such a level, the copolymer of the present invention or a forming material comprising the copolymer of the present invention discharged from an extruder can be cooled at a rate faster than natural spontaneous cooling, and therefore a sheet or a film having excellent surface smoothness and a low haze can easily be manufactured. When a film is obtained by particularly an extrusion method, the thickness of an unstretched film obtained by extrusion is preferably 10 µm to 300 µm. The haze of the film is preferably not more than 0.5%, and more preferably not more than 0.3% at a thickness of 100 µm.

Stretching treatment may be performed for the copolymer of the present invention formed into a film. Stretching treatment can enhance mechanical strength, so that a film more resistant to cracking can be obtained. Examples of stretching methods can include, but are not particularly limited to, simultaneous biaxial stretching method, sequential biaxial stretching method, and tubular stretching method. From a viewpoint that a film being uniformly stretched and having a high strength can be obtained, the lower limit of a temperature at the time of stretching is higher than the glass transition temperature of the copolymer by 10° C., and the upper limit of a temperature at the time of stretching is higher than the glass transition temperature of the copolymer by 40° C. Stretching is usually performed at a rate of 100 to 5000%/min. A film with less thermal shrinkage can be obtained by performing heat setting after stretching. The thickness of a film after stretching is preferably 10 to 200 µm.

Examples of the applications of the shaped product of the present invention can include: signboard members such as advertising pillars, stand signboards, side signboards, transom signboards, and roof signboards; display parts such as showcases, partition panels and store displays; illumination parts such as fluorescent lamp covers, mood lighting covers, lamp shades, luminous ceilings, luminous walls, and chandeliers; interior parts such as pendants and mirrors, architectural parts such as doors, domes, safety window glass, partitions, stair baseboards, balcony baseboards, and leisure building roofs; transportation related parts such as air plane windshields, pilot visors, motorcycle and motorboat windshields, bus sun visors, automobile side visors, rear visors, head wings, and headlight covers; electronic equipment parts such as faceplates for audiovisuals, stereo covers, television protective masks, and vending machine display covers; medical equipment parts such as incubators, and roentgen parts; instrument related parts such as machine covers, instrument covers, experiment devices, rulers, dials, and observation windows; optics related parts such as liquid crystal protective plates, light guide plates, light guide films, Fresnel's lens, lenticular lens, front panels of various displays, and diffusion plates; transportation related parts such as road signs, direction boards, traffic mirrors, and sound insulating walls; film members such as automobile interior surface materials, surface materials for cellular phones and marking films; members for household electrical appliances such as materials for canopies or control panels of washing machines, and top panels for rice cookers; and others such as greenhouses, large-sized water tanks, box-type water tanks, clock panels, bath tubs, sanitary products, desk mats, parts of recreational devices, toys, and face protecting masks when welding. A sheet or a film, which is an embodiment of the shaped product of the present invention, is excellent in thermal resistance and the like, and can exhibit increased transparency, and thus is suitable for optical applications and particularly suitable for use in a polarizer protective film, a liquid crystal protective plate, a surface material for portable digital assistants, a display window protective film for portable digital assistants, a light guide film, and a front panel for various displays.

The present invention will be described more specifically as follows with reference to Examples and Comparative examples, but the present invention is not limited to the following examples. Note that values of physical properties and the like were measured by the following methods.
(Weight Average Molecular Weight, Number Average Molecular Weight, and Molecular Weight Distribution)

Tetrahydrofuran as an eluent, and two TOSOH TSKgel SuperMultipore HZM-M columns connected in sequence with SuperHZ4000 as a column were used. As a GPC instrument, TOSOH HLC-8320 (model number) equipped with a differential refractive index detector (RI detector) was used. A polymer or copolymer to be tested, that is, 4 mg of the polymer or copolymer was dissolved in 5 ml of tetrahydrofuran to obtain a sample solution. A column oven was set at a temperature of 40° C., 20 µl of the sample solution was injected at an eluent flow rate of 0.35 ml/min to measure a chromatogram. Ten polystyrene standards having molecular weights of 400-5000000 were subjected to GPC measurement, and then a calibration curve showing the relationship between retention time and molecular weight was created. The weight average molecular weight (Mw) and the number average molecular weight (Mn) were determined on the basis of the calibration curve, and then a molecular weight distribution (Mw/Mn) was found.
(Glass Transition Temperature)

The DSC curve was measured using a differential scanning calorimeter (Shimadzu Corporation, DSC-50 (model number)) in accordance with JIS K7121 under conditions of increasing the temperature of the copolymer once to 270° C., cooling to room temperature, and then increasing the temperature again from room temperature to 270° C. at 10° C./min. The midpoint glass transition temperature found from the DSC curve measured at the second increasing temperature was designated as the glass transition temperature in the present invention.
($^1$H-NMR Measurement)

The structures of compounds synthesized in manufacturing examples and composition ratios for copolymerization of the copolymers of Examples and Comparative examples were confirmed by $^1$H-NMR. A $^1$H-NMR spectrum was measured using a nuclear magnetic resonance system (Bruker, ULTRA SHIELD 400 PLUS) and 1 mL of deuterochloroform as a solvent per 10 mg of a sample under conditions of room temperature and integration times of 64.
(Saturated Water Absorption)

A copolymer was subjected to heat press forming to obtain a test piece (B) with 80 mm×10 mm×4.0 mm in thickness. The test piece (B) was dried for 3 days under an environment at 50° C. and 667 Pa (5 mmHg) to obtain an absolute dry test piece. The mass W0 of the absolute dry test piece was measured. Subsequently, the absolute dry test piece was submerged in water at a temperature of 23° C. and then left to stand for 2 months. The test piece was pulled up from the water and then mass W1 of the test piece was measured. Saturated water absorption (% by mass) was calculated by the following formula. Saturated water absorption=$\{(W1-W0)/W\}\times 100$
(Decomposition Temperature)

Under a nitrogen atmosphere, a copolymer was subjected to thermal-mass spectroscopy (TG) performed at a rate of temperature increase of 10° C./min in accordance with JIS-K-7120. With the weight at 250° C. as the original point, a temperature at which the weight decreased by 2.5% was designated as the decomposition temperature. TGA-50 (model number, Shimadzu Corporation) was used as a measuring device.
(Flexural Modulus)

A copolymer was subjected to heat press forming to obtain test piece (B) with 80 mm×10 mm×4.0 mm in thickness. In accordance with JIS K7171, three-point bending was performed on the test piece (B) at 23° C. using an autograph (produced by Shimadzu Corporation), and then the flexural modulus (MPa) was measured.

Monomers to be used in Examples and Comparative examples were prepared as follows.

Methyl methacrylate (hereinafter, denoted as "MMA".)

Methyl acrylate (hereinafter, denoted as "MA".)

3-methacryloyloxymethyl-3-methyltetracyclo[4.4.0.1$^{2,5}$.1$^{7,10}$]dodecane (see formula (2), hereinafter, denoted as "DCPDMA".)

2-methacryloyloxymethyl-2-methylbicyclo[2.2.1]heptane (see formula (3), hereinafter, denoted as "CPDMA".)

8-tricyclo[5.2.1.0$^{2,6}$]decanyl methacrylate (see formula (4), hereinafter, denoted as "TCDMA".)

Note that the above CPDMA used herein was obtained in Manufacturing example 4 through the following Manufacturing examples 1 to 3, and the above DCPDMA used herein was obtained in manufacturing example 7 through the following Manufacturing examples 1, 5 and 6.

[Chem. 3]

(2)

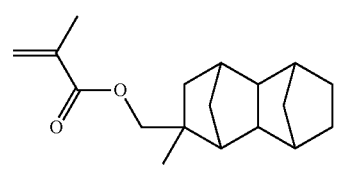

[Chem. 4]

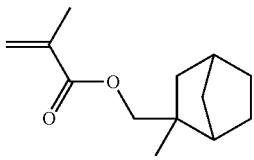
(3)

[Chem. 5]

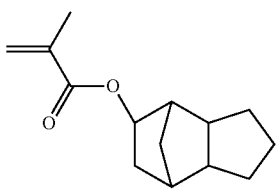
(4)

Manufacturing Example 1

Synthesis of 2-methoxycarbonyl-2-methylbicyclo [2.2.1]-5-heptene (i) and 3-methoxycarbonyl-3-methyltetracyclo[4.4.0.1$^{2,5}$.1$^{7,10}$]-8-dodecene (ii)

A sufficiently dried pressure-resistant vessel with a stirrer was purged with nitrogen. In the pressure-resistant vessel, 53 parts by mass of MMA and 0.25 part by mass of hydroquinone monomethyl ether were charged. After the pressure-resistant vessel was sufficiently purged with a nitrogen gas, and then the temperature was increased to 160° C. with stirring. Subsequently, while maintaining the temperature within the pressure-resistant vessel at 160° C., 70 parts by mass of dicyclopentadiene was added dropwise over 6 hours for reaction. After the completion of the reaction, the reaction mixture was distilled under reduced pressure, so that 69 parts by mass of 2-methoxycarbonyl-2-methyl bicyclo[2.2.1]-5-heptene (i) and 12 parts by mass of 3-methoxycarbonyl-3-methyltetracyclo[4.4.0.1$^{2,5}$.1$^{7,10}$]-8-dodecene (ii) were obtained.

[Chem. 6]

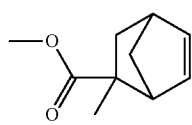
(i)

[Chem. 7]

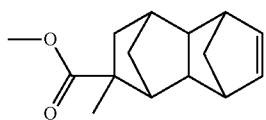
(ii)

Manufacturing Example 2

Synthesis of 2-methoxycarbonyl-2-methylbicyclo [2.2.1]heptane (iii)

A sufficiently dried pressure-resistant vessel with a stirrer was purged with nitrogen. In the pressure-resistant vessel, 120 parts by mass of 2-methoxycarbonyl-2-methylbicyclo [2.2.1]-5-heptene (i), 80 parts by mass of tetrahydrofuran, and 1.3 parts by mass of palladium-activated carbon (5% Pd) were charged. A hydrogen gas was fed to the pressure-resistant vessel with stirring, for 1 hour of reaction at 0.5 MPa. After the completion of the reaction, palladium-activated carbon was removed from the reaction mixture, and then tetrahydrofuran was evaporated under reduced pressure, so that 106 parts by mass of 2-methoxycarbonyl-2-methylbicyclo[2.2.1]heptane (iii) was obtained.

[Chem. 8]

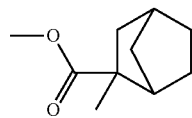
(iii)

Manufacturing Example 3

Synthesis of 2-hydroxymethyl-2-methylbicyclo [2.2.1]heptane (iv)

In a three-necked flask equipped with a thermometer, a stirrer and a dropping funnel, 400 parts by mass of tetrahydrofuran, and 99 parts by mass of 2-methoxycarbonyl-2-methylbicyclo[2.2.1]heptane (iii) were charged and stirred. In there, 171 parts by mass of sodium bis(2-methoxyethoxy) aluminum hydride (70% by mass toluene solution) was added dropwise through the dropping funnel over 1 hour. After 12 hours of reaction, the reaction mixture was washed with 237 parts by mass of 5% hydrochloric acid, 50 parts by mass of concentrated hydrochloric acid, and 200 parts by mass of 5% sodium hydrogencarbonate aqueous solution, and then washed twice with 200 parts by mass of ion exchanged water. After distillation under reduced pressure, recrystallization was performed using acetonitrile, so that 60 parts by mass of 2-hydroxymethyl-2-methylbicyclo[2.2.1] heptane (iv) was obtained.

[Chem. 9]

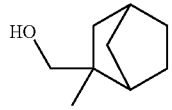
(iv)

Manufacturing Example 4

Synthesis of 2-methacryloyloxymethyl-2-methylbicyclo [2.2.1]heptane (CPDMA)

In a three-necked flask equipped with a thermometer, a stirrer and a dropping funnel, 250 parts by mass of toluene, 50 parts by mass of 2-hydroxymethyl-2-methylbicyclo [2.2.1]heptane (iv), and 42 parts by mass of triethylamine were charged and stirred. While cooling with an ice bath, 37.9 parts by mass of methacryloyl chloride was added dropwise through the dropping funnel over 2 hours. After 2 hours of reaction, 50 parts by mass of ion exchanged water was added. Subsequently, the resultant was washed with 100 parts by mass of 5% hydrochloric acid and 100 parts by mass of 5% sodium hydrogencarbonate, and then washed twice with 100 parts by mass of ion exchanged water. After concentration by distillation under reduced pressure, purification was performed by column chromatography, and thus 62 parts by mass of 2-methacryloyloxymethyl-2-methylbicyclo[2.2.1]heptane (CPDMA, see formula (3)) was obtained.

Manufacturing Example 5

Synthesis of 3-methoxycarbonyl-3-methyltetracyclo [4.4.0.1$^{2,5}$.1$^{7,10}$]dodecane (v)

A sufficiently dried pressure-resistant vessel with a stirrer was purged with nitrogen. In a pressure-resistant vessel, 80 parts by mass of 3-methoxycarbonyl-3-methyltetracyclo [4.4.0.1$^{2,5}$.1$^{7,10}$]-8-dodecene (ii), 80 parts by mass of tetrahydrofuran, and 0.9 part by mass of palladium-activated carbon were charged. In the same manner as in Manufacturing example 2 except for changing compounds to be charged, 67 parts by mass of 3-methoxycarbonyl-3-methyltetracyclo [4.4.0.1$^{2,5}$.1$^{7,10}$]dodecane (v) was obtained.

[Chem. 10]

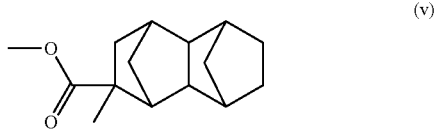

(v)

Manufacturing Example 6

Synthesis of 3-hydroxymethyl-3-methyltetracyclo [4.4.0.1$^{2,5}$.1$^{7,10}$]dodecane (vi)

In a three-necked flask equipped with a thermometer, a stirrer and a dropping funnel, 680 parts by mass of tetrahydrofuran and 136 parts by mass of 3-methoxycarbonyl-3-methyltetracyclo[4.4.0.1$^{2,5}$.1$^{7,10}$]dodecane (v) were charged and stirred. In there, 200 parts by mass of sodium bis(2-methoxyethoxy)aluminum hydride (70% by mass toluene solution) was added dropwise through the dropping funnel over 1 hour. In the same manner as in Manufacturing example 3 except for changing compounds to be charged, 82 parts by mass of 3-hydroxymethyl-3-methyltetracyclo [4.4.0.1$^{2,5}$.1$^{7,10}$]dodecane (vi) was obtained.

[Chem. 11]

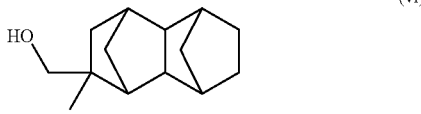

(vi)

Manufacturing Example 7

Synthesis of 3-methacryloyloxymethyl-3-methyl tetracyclo[4.4.0.1$^{2,5}$.1$^{7,10}$]dodecane (DCPDMA)

In a three-necked flask equipped with a thermometer, a stirrer and a dropping funnel, 250 parts by mass of toluene, 44 parts by mass of 3-hydroxymethyl-3-methyltetracyclo [4.4.0.1$^{2,5}$.1$^{7,10}$]dodecane (vi), and 42 parts by mass of triethylamine were charged and stirred. While cooling with an ice bath, 22.3 parts by mass of methacryloyl chloride was added dropwise through the dropping funnel over 2 hours. In the same manner as in Manufacturing example 4 except for changing compounds to be charged, 65 parts by mass of -methacryloyloxymethyl-3-methyltetracyclo[4.4.0.1$^{2,5}$.1$^{7,10}$]dodecane (DCPDMA) was obtained.

Example 1

A sufficiently dried pressure-resistant vessel with a stirrer was purged with nitrogen. In the pressure-resistant vessel, 7.9 parts by mass of MMA, 2.1 parts by mass of DCPDMA, 0.1 part by mass of MA, and 0.012 part by mass of n-octyl mercaptan were charged.

The pressure-resistant vessel was sufficiently purged with a nitrogen gas, and the temperature was increased to 140° C. with stirring. To the pressure-resistant vessel, 0.0003 part by mass of di-t-butyl peroxide (NOF Corporation: PERBUTYL D) was added to initiate polymerization. Four hours after initiation of polymerization, the temperature was decreased to room temperature and then polymerization was stopped. In the thus obtained solution, 50 parts by mass of toluene was added to dilute the solution, and then the resultant was poured in 4000 parts by mass of methanol, so that a solid was precipitated. The precipitated solid was filtered off, and then sufficiently dried, thereby obtaining 4.8 parts by mass of copolymer (A1). Copolymer (A1) was subjected to 1H-NMR analysis, so that the content of structural units derived from MMA was 81% by mass, the content of structural units derived from DCPDMA was 18% by mass, and the content of structural units derived from MA was 1% by mass. Copolymer (A1) had a weight average molecular weight (Mw) of 221,000 and a molecular weight distribution (Mw/Mn) of 2.42. Other evaluation results are shown in Table 1.

Example 2

In the same manner as in Example 1 except that charged were 8.9 parts by mass of MMA, 1.0 part by mass of DCPDMA, 0.1 part by mass of MA, and 0.012 part by mass of n-octyl mercaptan in the pressure-resistant vessel, 4.4 parts by mass of copolymer (A2) was obtained. Copolymer (A2) was subjected to $^1$H-NMR analysis, so that the content of structural units derived from MMA was 89.9% by mass, the content of structural units derived from DCPDMA was 9.1% by mass, and the content of structural units derived from MA was 1% by mass. Copolymer (A2) had a weight average molecular weight (Mw) of 208,000 and a molecular weight distribution (Mw/Mn) of 2.12. Other evaluation results are shown in Table 1.

Comparative Example 1

In the same manner as in Example 1 except that charged were 5.9 parts by mass of MMA, 4.1 parts by mass of DCPDMA, 0.1 part by mass of MA, and 0.012 part by mass of n-octyl mercaptan in the pressure-resistant vessel, 4.6 parts by mass of copolymer (B1) was obtained. Copolymer (B1) was subjected to $^1$H-NMR analysis, so that the content of structural units derived from MMA was 62.2% by mass, the content of structural units derived from DCPDMA was 36.8% by mass, and the content of structural units derived from MA was 1% by mass. Copolymer (B1) had a weight average molecular weight (Mw) of 190,000 and a molecular weight distribution (Mw/Mn) of 2.06. Other evaluation results are shown in Table 1.

Comparative Example 2

In the same manner as in Example 1 except that charged were 7.9 parts by mass of MMA, 2.0 parts by mass of CPDMA, 0.1 part by mass of MA, and 0.012 part by mass of n-octyl mercaptan in the pressure-resistant vessel, 4.5 parts by mass of copolymer (B2) was obtained. Copolymer (B2) was subjected to $^1$H-NMR analysis, the content of structural units derived from MMA was 80.6% by mass, the content of structural units derived from CPDMA was 18.4% by mass, and the content of structural units derived from MA was 1% by mass. Copolymer (B2) had a weight average molecular weight (Mw) of 197,000 and a molecular weight distribution (Mw/Mn) of 2.14. Other evaluation results are shown in Table 1.

Comparative Example 3

In the same manner as in Example 1 except that charged were 7.9 parts by mass of MMA, 2.0 parts by mass of TCDMA, 0.1 part by mass of MA, and 0.012 part by mass of n-octyl mercaptan in the pressure-resistant vessel, 4.7 parts by mass of copolymer (B3) was obtained. Copolymer (B3) was subjected to $^1$H-NMR analysis, so that the content of structural units derived from MMA was 80.8% by mass, the content of structural units derived from TCDMA was 18.2% by mass, and the content of structural units derived from MA was 1% by mass. Copolymer (A3) had a weight average molecular weight (Mw) of 207,800 and a molecular weight distribution (Mw/Mn) of 2.11. Other evaluation results are shown in Table 1.

transition temperature and thus were excellent in thermal resistance, and had high decomposition temperatures and thus were excellent in resistance to thermal decomposition. Moreover, as understood from Examples 1 and 2 and Comparative example 1, the value of flexural modulus can be increased and fragility can be suppressed by lowering the content of structural units derived from the monomer represented by formula (1).

In addition, when test pieces (B) of copolymers (A1), (A2) and (B1) to (B3) used for determination of saturated water absorption were visually observed, all test pieces were transparent. Moreover, no changes were observed in shape and thus were excellent in dimensional stability.

The invention claimed is:

1. A methacrylic copolymer, comprising 5 to 22% by mass of a structural unit derived from a monomer represented by formula (1) and 78 to 95% by mass of a structural unit derived from methacrylic acid ester monomer other than the monomer represented by the formula (1), and having a saturated water absorption of not more than 1.6% by mass,

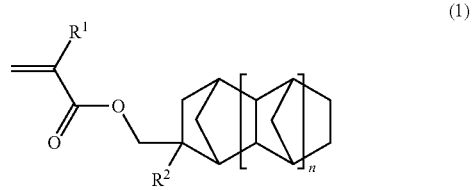

(1)

wherein, in the formula (1), $R^1$ represents a hydrogen atom or a methyl group, $R^2$ represents an alkyl group having 1 to 4 carbon atoms, and "n" represents an integer of 1 to 3.

TABLE 1

|  |  | Ex. 1<br>A1 | Ex. 2<br>A2 | Comp.<br>EX. 1<br>B1 | Comp.<br>Ex. 2<br>B2 | Comp.<br>Ex. 3<br>B3 |
| --- | --- | --- | --- | --- | --- | --- |
| Compostion ratio of Copolymer [% by mass] |  |  |  |  |  |  |
| Monomer represented by formula (1) | DCPDMA | 18 | 9.1 | 36.8 |  |  |
| Monomer (2) | MMA | 81 | 89.9 | 62.2 | 80.6 | 80.8 |
|  | CPDMA |  |  |  | 18.4 |  |
|  | TCDMA |  |  |  |  | 18.2 |
| Monomer (3) | MA | 1 | 1 | 1 | 1 | 1 |
| Molecular weight of copolymer |  |  |  |  |  |  |
| Weight average molecular weight | g/mol | 221,000 | 208,000 | 190,000 | 197,300 | 207,800 |
| Mw/Mn |  | 2.42 | 2.12 | 2.06 | 2.14 | 2.11 |
| Physical value of copolymer |  |  |  |  |  |  |
| Glass transition temperature | ° C. | 125 | 122 | 129 | 118 | 126 |
| Saturated water absorption | % by mass | 1.2 | 1.5 | 0.73 | 1.3 | 1.3 |
| Decomposition temperature | ° C. | 308 | 295 | 322 | 294 | 299 |
| Flexural modulus | MPa | 3100 | 3200 | 2900 |  |  |

As shown in Table 1, copolymers (A1) and (A2) comprising structural units derived from the monomer represented by formula (1) had low saturated water absorption and thus were low in water absorbability, had a high glass 2. The methacrylic copolymer according to claim 1, wherein the methacrylic acid ester monomer other than the monomer represented by the formula (1) is methyl methacrylate.

3. The methacrylic copolymer according to claim 1, wherein the monomer represented by the formula (1) is 3-(meth)acryloyloxymethyl-3-methyltetracyclo [4.4.0.1$^{2,5}$.1$^{7,10}$]dodecane.

4. The methacrylic copolymer according to claim 2, wherein the monomer represented by the formula (1) is 3-(meth)acryloyloxymethyl-3-methyltetracyclo [4.4.0.1$^{2,5}$.1$^{7,10}$]dodecane.

5. A shaped product, comprising the methacrylic copolymer according to claim 1.

6. The shaped product according to claim 5, which is a sheet or a film.

7. A shaped product, comprising the methacrylic copolymer according to claim 2.

8. The shaped product according to claim 7, which is a sheet or a film.

9. A shaped product, comprising the methacrylic copolymer according to claim 3.

10. The shaped product according to claim 9, which is a sheet or a film.

11. A shaped product, comprising the methacrylic copolymer according to claim 4.

12. The shaped product according to claim 11, which is a sheet or a film.

\* \* \* \* \*